United States Patent [19]

Bowen

[11] 4,382,393

[45] May 10, 1983

[54] RETROFITTABLE OVERDRIVE ASSEMBLY

[75] Inventor: Thomas C. Bowen, Westlake Village, Calif.

[73] Assignee: Trans Auto Specialties, Inc., Cleveland, Ohio

[21] Appl. No.: 142,618

[22] Filed: Apr. 21, 1980

[51] Int. Cl.³ ............................................ F16H 47/08
[52] U.S. Cl. ........................................ 74/688; 74/730
[58] Field of Search ............... 74/655, 720, 730–732, 74/688

[56] References Cited

U.S. PATENT DOCUMENTS

| | | | |
|---|---|---|---|
| 2,260,846 | 10/1941 | Voytech | 74/688 |
| 2,449,586 | 9/1948 | Carnagua | 74/720 |
| 2,949,794 | 8/1960 | Boehm | 74/732 |
| 2,969,694 | 1/1961 | Harmon et al. | 74/688 |
| 2,983,164 | 5/1961 | Herndon et al. | 74/730 |
| 3,006,199 | 10/1961 | Christenson et al. | 74/730 |
| 3,023,637 | 3/1962 | De Lorean | 74/688 |
| 3,054,307 | 9/1962 | Burchkhardt | 74/720 |
| 3,435,707 | 4/1969 | De Julian | 74/688 |

FOREIGN PATENT DOCUMENTS 509763  1/1939  United Kingdom ................. 74/730

Primary Examiner—Lawrence J. Staab
Attorney, Agent, or Firm—Michael A. Kondzella

[57] ABSTRACT

An overdrive assembly is adapted to be retrofitted into an automobile between the engine and the automatic transmission. The overdrive can be retrofitted to most domestic cars and light trucks equipped with automatic transmissions. The overdrive can be retrofitted without modifying the automobile chassis and without introducing any additional controls into the automobile.

The overdrive assembly includes a housing rotatable at the speed of the engine. This is accomplished by coupling the housing of the overdrive assembly to the engine. A gear assembly converts the rotation of the housing to a rotation of a gear in the assembly at a speed greater than the speed of the housing. The gear assembly may include a stationary sun gear, a planetary gear rotatable with the housing and a ring gear rotatable at a speed greater than the speed of the housing to provide the overdrive. The ring gear drives an impeller. A turbine is hydraulically coupled to the impeller to rotate at the speed of the impeller. The turbine drives the transmission through a shaft.

In another embodiment, the impeller may rotate with the housing and the turbine may drive the planetary gear. The ring gear may then drive the transmission in the overdrive relationship.

8 Claims, 5 Drawing Figures

RETROFITTABLE OVERDRIVE ASSEMBLY

This invention relates to overdrive assemblies for automobiles. More particularly, the invention relates to overdrive assemblies which are retrofittable to most domestic automobiles and light trucks equipped with automatic transmissions without requiring any chassis modification.

Automobiles are generally provided with different gear ratios between the engine and the axle for driving the wheels of the automobile. The different gear ratios become operative at progressive speeds of the automobile. For example, a high gear ratio is provided at low vehicle speeds. The gear ratio becomes decreased as the speed of the vehicle increases. This provides for an efficient operation of the engine and prevents the engine from becoming overloaded. It also provides for an efficient use of fuel such as gasoline.

Some automobiles have a gear ratio which is known as overdrive. This gear ratio becomes operative when the vehicle is operating at a relatively high speed. For example, the gear ratio is particularly effective when an automobile is travelling at high speeds along a highway. In overdrive, the gear ratio is even lower than the gear ratio is direct drive.

Most automobiles on the highway do not have an overdrive gear ratio. However, a number of owners decide that they would like to have overdrive after they have purchased their automobiles. A fair number even attempt to retrofit their automobiles with overdrive assemblies after they have operated the automobiles for a while.

It has not been easy until now to retrofit automobiles with overdrive assemblies. One difficulty has been that the owner has had to modify the chassis, sometimes on a major basis. Furthermore, controls often have to be installed to provide an engagement and disengagement of the overdrive assemblies. The overdrive assemblies have also been relatively inefficient. Such problems in retrofitting automobiles have continued to exist even though a considerable effort has been made to solve such problems.

This invention provides an overdrive assembly which overcomes the above disadvantages. The overdrive assembly of this invention can be inserted in the space between the engine and the transmission to replace conventional torque converter disposed in that space.

The overdrive assembly of this invention can be inserted without any modifications to the chassis and without introducing any additional controls. The overdrive assembly of this invention operates efficiently at all speeds to transfer power from the engine to the transmission.

The overdrive assembly of this invention includes a housing rotatable at the speed of the engine. A gear assembly converts the rotation of the housing to a rotation of a gear in the assembly at a speed greater than the speed of the housing. The gear assembly may include a stationary sun gear, a planetary gear rotatable with the housing and a ring gear rotatable at a speed greater than the speed of the housing.

The ring gear drives an impeller. A turbine is hydraulically coupled to the impeller to rotate at the speed of the impeller. The turbine drives the transmission. If desired, a clutch may be disposed on the turbine to engage the impeller member at high speeds and provide for a movement of the turbine with the impeller at high speeds without any slippage.

In another embodiment, the impeller may rotate with the housing and the turbine may drive the planetary gear. The ring gear may then drive the transmission in the overdrive relationship. This drive may occur directly or through other gears. This embodiment offers the advantage of simplicity in construction and operation.

In a preferred embodiment, the impeller rotates with the housing and the turbine drives the planetary gear carrier in a first set, with the sun gear in that set grounded. The ring gear in the first set then drives a ring gear in a second set. The sun gear in the second set is driven by the engine and the planetary gear carrier in the second set is coupled to the transmission input shaft. As a result, the planetary gear carrier in the second set is driven at a speed between the speed of the engine and the speed of the ring gears.

The preferred embodiment is advantageous because some of the power is transferred mechanically to the planetary gear in the second set from the engine so that no slippage occurs. Only a portion of the power is transferred hydraulically to the planetary gear in the second set. As a result, only some of the power in the planetary gear of the second set is subject to slippage.

Figure 1:
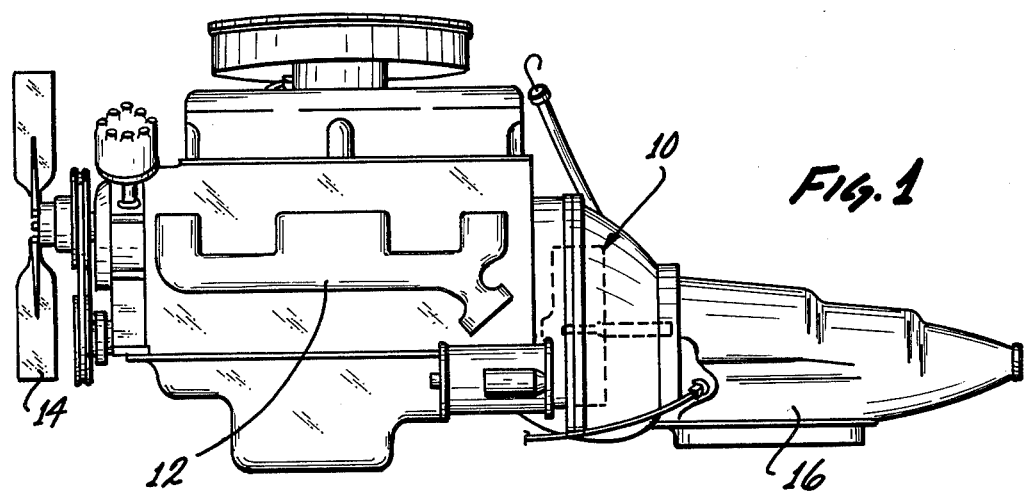
FIG. 1 is a schematic view of an automobile drive train including an engine and a transmission and further illustrates the disposition in the automobile of a retrofittable overdrive arrangement constituting one embodiment of the invention.

In the embodiments of the invention shown in the drawings, an overdrive assembly or arrangement generally indicated at 10 (FIG. 1) is adapted to be retrofitted in an automobile. The automobile includes an engine 12, a fan 14 and a transmission 16. The overdrive arrangement 10 is adapted to be disposed between the engine 12 and the transmission 16 in the space normally occupied by a conventional torque converter. The overdrive arrangement 10 can be retrofitted into the automobile without any modification to the chassis of the automobile.

Figure 2:
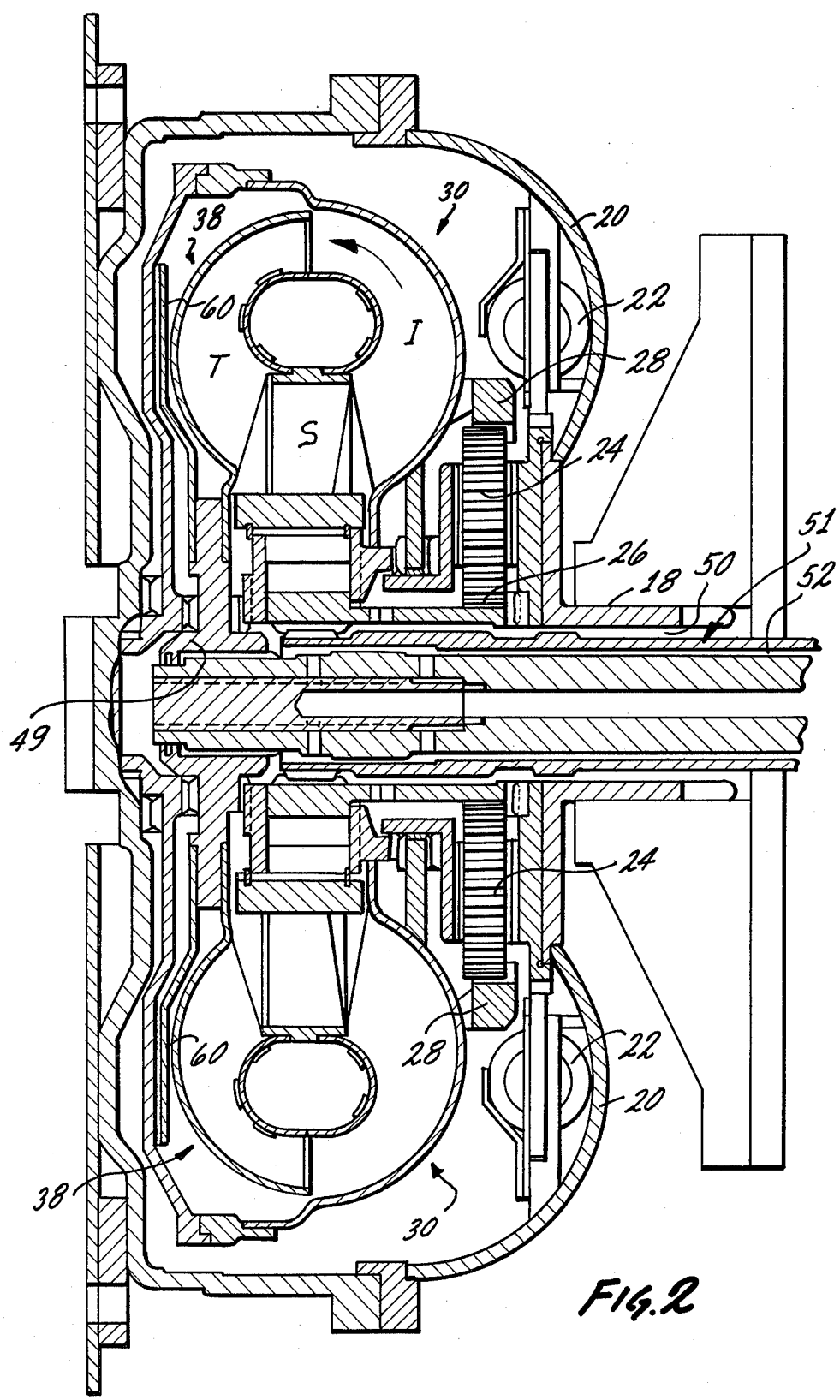
FIG. 2 is an enlarged detailed sectional view of the embodiment of the overdrive arrangement shown in FIG. 1.
Figure 3:
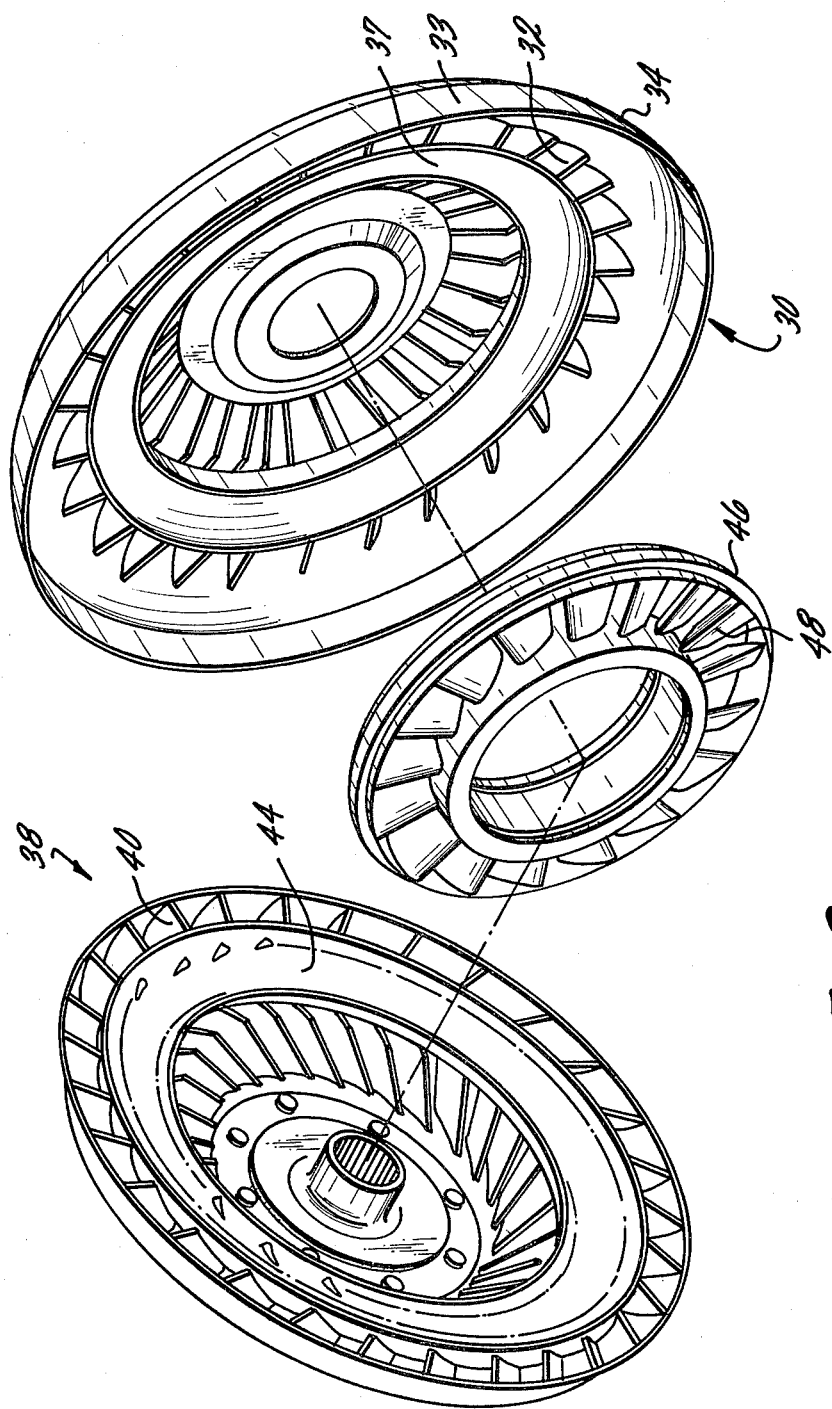
FIG. 3 is an enlarged exploded perspective view showing additional features of a torque converter included in the embodiment of the overdrive arrangement shown in FIG. 2.

The overdrive arrangement includes a housing 20 (FIG. 2) which is coupled to the engine. A vibration damper 22 is attached to the housing 20 to damp any vibrations in the movement of the housing. A planetary gear 24 is coupled to the housing 20 to be driven with the housing. The planetary gear cooperates with a stationary sun gear 26 which is mounted to the transmission housing. The planetary gear 24 in turn drives a ring gear 28 at a greater speed than the speed of the planetary gear.

The ring gear 28 is attached to an impeller generally indicated at 30. A plurality of fins 32 are attached to a cover 34 at spaced positions around the annular periphery of the cover to drive hydraulic fluid in a rotary direction as the cover rotates. The fins 32 are separated from each other by a channel member 37 which is supported by the fins 32 in spaced relationship to the cover 34. The channel member is provided with a curved configuration in cross section.

A turbine generally indicated at 38 is disposed in cooperative relationship with the impeller 30. The turbine 38 is provided with fins 40 respectively corresponding to the fins 32 in the impeller and is provided with a channel member corresponding to the channel member 37 in the impeller. A stator 46 is disposed between the impeller 30 and the turbine 38 and is provided with angled blades 48 annularly spaced from each other. The turbine 38 is connected to one end of a shaft 49, the other end of which is connected to the transmission 16 to drive the transmission.

Passages may be provided in the overdrive arrangement for the introduction of oil into the arrangement and the passage of oil from the arrangement. An inlet passage is illustrated at 50 and an outlet passage is illustrated at 52. The passages 50 and 52 are defined by spaces between the shafts 18 and 51, both of which are hollow and are disposed in nested and concentric relationship.

The housing 20 is adapted to be driven in accordance with the operation of the engine. The housing in turn drives the ring gear 28 at an elevated speed corresponding to overdrive. The ring gear 28 in turn drives the impeller 30. Fluid then flows outwardly in the impeller 30 in the space between the fins 32 and the space between the channel member 37 and the cover 34. The fluid then flows through the space between the fins 40 in the turbine 38. The fins 40 channel the fluid in a downward direction causing the fluid to flow through the stator 46 in the space between the blades 48, the space between the channel member and the cover of the turbine and the space between the fins 40. This fluid flow causes the turbine 38 to rotate at substantially the same speed as the impeller 30. The turbine 38 in turn drives the transmission 16 through the shaft 49.

The overdrive arrangement described above has certain important advantages. One important advantage is that it can be disposed in the space normally occupied by the torque converter and can actually be retrofitted easily into that space. Furthermore, such retrofitting can be provided without any modification of the automobile chassis. As a result, the overdrive arrangement can be retrofitted by amateur mechanics or do-it-yourself technicians without any great difficulty.

The overdrive arrangement also has other advantages of some importance. For example, it does not require the addition of any new controls in the automobile or the modification of any existing controls in the automobile. This may be seen from the automatic operation of the overdrive arrangement of this invention in converting the speed of the engine into an elevated speed of the transmission. Furthermore, since the operation of the overdrive arrangement of this invention is automatic, no shifting or shift timing at different speeds is required. In this sense, the overdrive arrangement is different from any arrangements now in use since such arrangements require controls to engage or disengage the overdrive arrangement.

There are other advantages to the overdrive arrangement of this invention. One such advantage is that, at road speeds, the pump transmitting oil to the transmission operates at a lower speed than it would normally operate without the inclusion of the overdrive arrangement. Since the pump is operating at a reduced speed, it absorbs a decreased amount of power.

A clutch 60 (FIG. 2) may be provided on the turbine 38 to engage the impeller 30 when the speed of the turbine approaches the speed of the impeller. By including the clutch 60, slip between the impeller 30 and the turbine 38 is inhibited at high speeds.

When the clutch 60 is included, some controls may be necessary. For example, taps should perhaps be provided in the valve body in the transmission to determine fluid pressures. Such pressures may preferably be determined in order to engage the clutch when a particular hydraulic pressure has been reached in the fluid driving the governor circuit. An additional channel may also be provided for the introduction of oil to the clutch.

Figure 4:
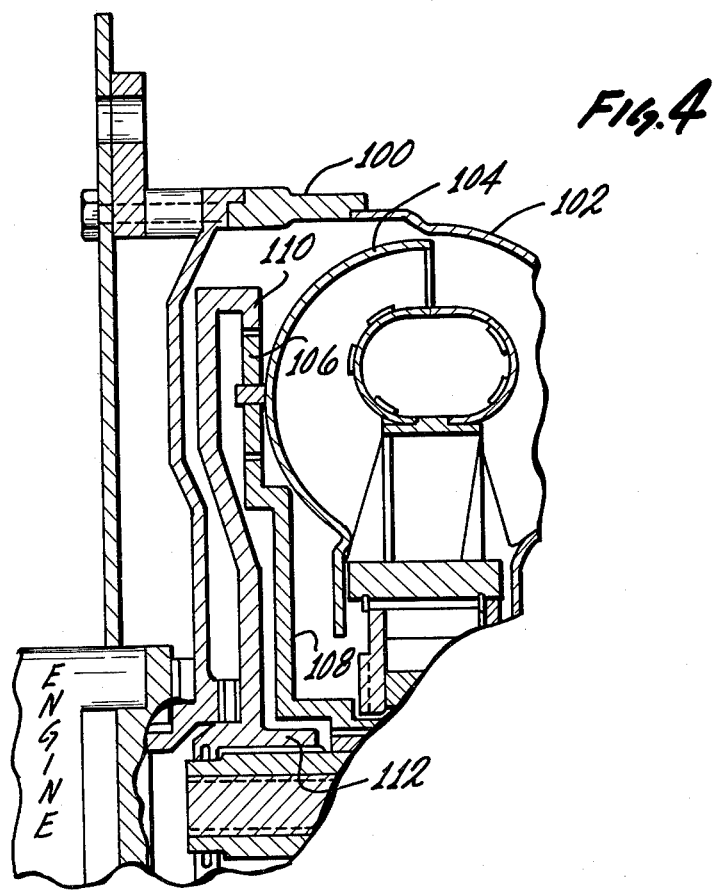
FIG. 4 is a fragmentary schematic view of another embodiment of the invention.

FIG. 4 illustrates another embodiment of the invention. In this embodiment, a housing 100 rotates in accordance with the speed of the engine. The housing 100 drives an impeller 102 which is hydraulically coupled to a turbine 104. The construction of the impeller 102 and the turbine 104 may correspond to that described above. The turbine 104 in turn drives a planetary gear 106 which is included in a gear set with a stationary sun gear 108 and a ring gear 110. The ring gear 110 drives in an overdrive relationship a shaft 112 leading to a transmission.

The embodiment shown in FIG. 4 has certain important advantages. One advantage is that it has a relatively low mass. This tends to minimize energy losses in the unit and also tends to minimize the time for the transmission to reach a desired speed. Another advantage is that the unit tends to provide a minimal amount of fluid disturbance. This is particularly true since the turbine means formed by the impeller 102 and the turbine 104 is at the input side, rather than the output side, of the overdrive arrangement provided by the gears.

Figure 5:
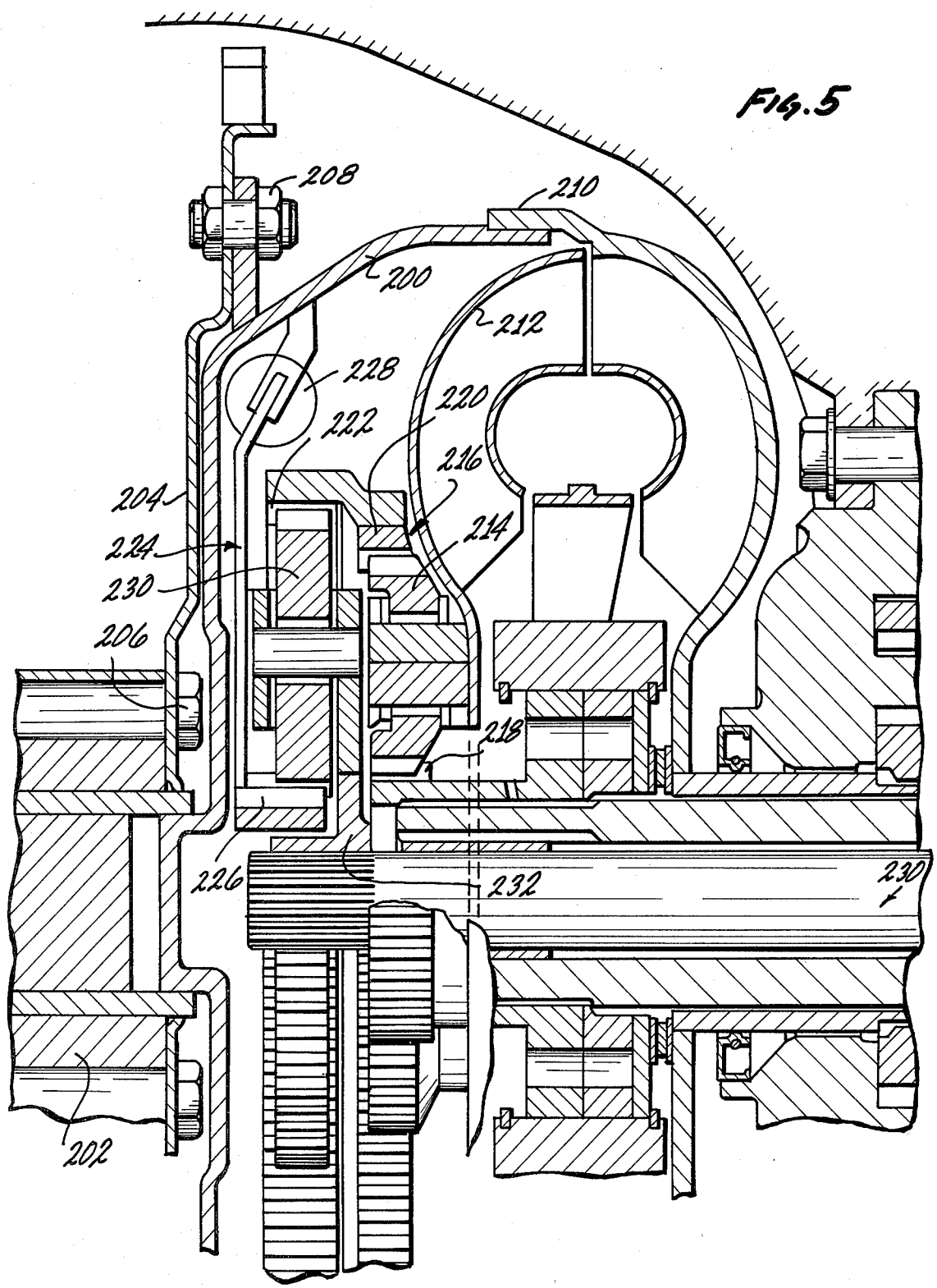
FIG. 5 is a fragmentary schematic view of still another embodiment of the invention.

The preferred embodiment of the invention is shown in FIG. 5. In this embodiment, a housing 200 is mechanically coupled to an engine 12. The housing 200 is in turn mechanically fastened to an impeller 210. The impeller 210 drives a turbine 212 hydraulically in a manner similar to that described above in detail. The turbine 212 in turn drives a planetary gear 214 of a first gear set generally indicated at 216. The sun gear 218 of the first set 216 is stationary and the ring gear 220 is overdriven. The ring gear 220 of the first set is mechanically coupled to a ring gear 222 of a second gear set generally indicated at 224. The sun gear 226 of the second set is driven at the speed of the engine by the housing 200, the drive being made through a vibration damper 228 disposed between the housing and the sun gear. The planetary gear 230 of the second set 224 drives the transmission, generally indicated at 232, through a coupling member 232.

The embodiment shown in FIG. 5 is preferred because it offers certain advantages in addition to those obtained from the embodiments shown in FIGS. 1 through 4 and described above. For example, there is relatively little slip in the embodiment of FIG. 5. This results from the fact that the sun gear 226 in the second gear set 224 is driven by the engine. This causes only the power transferred to the planetary gear 230 as a result of the differences in speed between the ring gear 220 and the sun gear 218 to be subject to slip. Since this difference in speed is relatively small compared to the speed of the engine, only a relatively small amount of the power transferred to the planetary gear 230 is subject to slip.

A high efficiency is obtained in the embodiment of FIG. 5 without the inclusion of a clutch. Actually, the efficiency obtained from the embodiment of FIG. 5 is almost as high as that obtained from embodiments which include the clutch. Since a clutch does not have to be included in the embodiment of FIG. 5, the transmission does not have to be modified. In this way, the embodiment of FIG. 5 provides a high efficiency without requiring any modification to the transmission.

The embodiment shown in FIG. 5 may have a specific construction such as described below. For example, the sun gear 218 in the first set 216 may have twenty eight (28) teeth and the ring gear 220 in the first set may have sixty eight (68) teeth. The ring gear 222 in the second set 224 may have ninety four (94) teeth and the sun gear 226 in the second set may have twenty six (26) teeth.

In the specific embodiment described in the previous paragraph, the engine may be operating at approximately two thousand revolutions per minute (2000 rpm) in the cruise mode. Under such circumstances, the ring gear 222 in the second set will be operating at approximately twenty seven hundred and ten revolutions per minute (2710 rpm) and the planetary gear 230 in the second set may be driving the transmission at approximately twenty five hundred and fifty six revolutions per minute (2556 rpm).

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A retrofittable overdrive assembly for use in an automobile which includes an engine, a transmission disposed in spaced relationship to the engine, and a torque converter disposed between the engine and the transmission, comprising a housing adapted to be retrofitted into the existing space between the engine and the transmission normally occupied by the torque converter for coupling to the engine at the speed of the engine;

turbine means disposed within the housing, consisting of an impeller and a turbine, the impeller being operatively coupled to the housing for rotation by the housing, and the turbine being hydraulically coupled to the impeller for rotation with the impeller; and gear means disposed within the housing for producing an increase in speed by a particular factor relative to the speed of the engine, said gear means including first and second sets of gears, the gears in the first set being driven by said turbine and being coupled to a first gear in the second set to drive said first gear, the gears in the second set including a second gear driven by the housing and including a third gear operatively coupled to the first and second gears and to the transmission to drive the transmission.

2. A retrofittable overdrive assembly for use in an automobile which includes an engine, a transmission disposed in spaced relationship to the engine, and a torque converter disposed between the engine and the transmission, comprising a housing adapted to be retrofitted into the existing space between the engine and the transmission normally occupied by the torque converter for coupling to the engine to be driven by the engine at the speed of the engine;

turbine means disposed within the housing consisting of an impeller and a turbine, the impeller being operatively coupled to the housing for rotation by the housing and the turbine being hydraulically coupled to the impeller for rotation with the impeller; and gear means disposed within the housing for producing an increase in speed by a particular factor relative to the speed of the engine, said gear means including first and second sets of ring, sun and planetary gears, the planetary gear in the first set being driven by the turbine, the sun gear being stationary and the ring gear being overdriven and being coupled to the ring gear in the second set, the sun gear in the second set being driven by the housing and the planetary gear in the second set driving the transmission.

3. The assembly set forth in claim 2, including, a vibration damper disposed between the housing and the sun gear in the second set.

4. A retrofittable overdrive assembly for use in an automobile which includes an engine, a transmission disposed in spaced relationship to the engine, and a torque converter disposed between the engine and the transmission, comprising a housing adapted to be retrofitted into the existing space between the engine and the transmission normally occupied by the torque converter for coupling to the engine to be driven by the engine at the speed of the engine;

turbine means disposed within the housing consisting of an impeller and a turbine hydraulically driven by the impeller for movement with the impeller, said impeller being coupled to the housing; and gear means disposed within the housing including first and second sets of gears, said first set of gears including a stationary first gear, a second gear driven by the turbine meshed with the first gear and a third gear meshed with the second gear and overdriven relative to the second gear, said second set of gears including a first gear, driven by the housing, a second gear, and an overdriven third gear driven by the overdriven third gear in the first set, the second gear of the second set driving the transmission.

5. The assembly set forth in claim 4 wherein the first gears in the first and second sets are sun gears, the second gears in the first and second sets are planetary gears and the third gears in the first and second sets are ring gears.

6. A retrofittable overdrive assembly for use in an automobile which includes an engine, a transmission disposed in spaced relationship to the engine, and a torque converter disposed between the engine and the transmission, comprising a rotatable housing adapted to be retrofitted into the existing space between the engine and the transmission normally occupied by the torque converter for coupling to the engine to be driven by the engine at the speed of the engine;

an impeller disposed within the housing and coupled to the housing;

a single turbine disposed within the housing hydraulically coupled to the impeller for movement with the impeller;

and gear means disposed within the housing operatively coupled to the housing, said gear means including first and second sets of gears, said first set of gears, being coupled to said turbine, said second set of gears including a first gear driven at a speed greater than the speed of the engine, a second gear driven at the speed of the engine, and a third gear for driving the transmission at a speed intermediate the speeds of the first and second gears in the second set.

7. The assembly set forth in claim 6 wherein the first, second and third gears in the second set respectively constitute ring, sun and planetary gears and the first set includes a stationary gear and a gear driven at the speed of the engine.

8. The assembly set forth in claim 6 wherein the first set of gears includes first, second and third gears respectively constituting ring, sun and planetary gears and wherein a vibration damper is included to damp between the housing and the second gear in the second set.

* * * * *